LE ROY WILLOUR.
STORAGE STAND.
APPLICATION FILED NOV. 19, 1910.

990,025.

Patented Apr. 18, 1911.

Witnesses
J. Milton Jester
B. F. Fishburne

Inventor
LeRoy Willour

By
C. L. Parker
Attorney

UNITED STATES PATENT OFFICE.

LE ROY WILLOUR, OF ASHLAND, OHIO, ASSIGNOR TO ASHLAND MANUFACTURING COMPANY, OF ASHLAND, OHIO, A CORPORATION OF OHIO.

STORAGE-STAND.

990,025.                Specification of Letters Patent.      Patented Apr. 18, 1911.

Application filed November 19, 1910. Serial No. 593,187.

*To all whom it may concern:*

Be it known that I, LE ROY WILLOUR, a citizen of the United States, residing at Ashland, in the county of Ashland and State of Ohio, have invented certain new and useful Improvements in Storage-Stands, of which the following is a specification.

My invention relates to a device which I term a storage stand, the same being an adjustable stand, or support for holding a load which has been previously elevated by a jack or other means.

It has been found by persons having experience in connection with automobiles or the like, that the pneumatic tires are greatly saved by elevating the automobile during the night or other time when the same is not in use, so that the pressure exerted upon the tires by the weight of the automobile is taken off of said tires.

In the employment of my device, which is termed a storage stand, an ordinary jack is first employed to raise the axle of the automobile or the like, the proper distance, and then the support-bar of the storage stand is adjusted to engage said axle. The jack is then removed and the axle supported by the storage stand. It is to be understood that it ordinary takes four of these storage stands to support an automobile in an elevated position so that its weight is taken off of the tires.

An important object of my invention is to provide a device of the above character, which is characterized by its simplicity of structure and cheapness at which the same may be manufactured.

A further object of this invention is to provide a device of the above character comprising a support-bar which may be readily adjusted to engage the load and positively lock it in its adjusted position.

Other objects and advantages of this invention may be apparent during the course of the following description.

Figures 1, 2, 3:
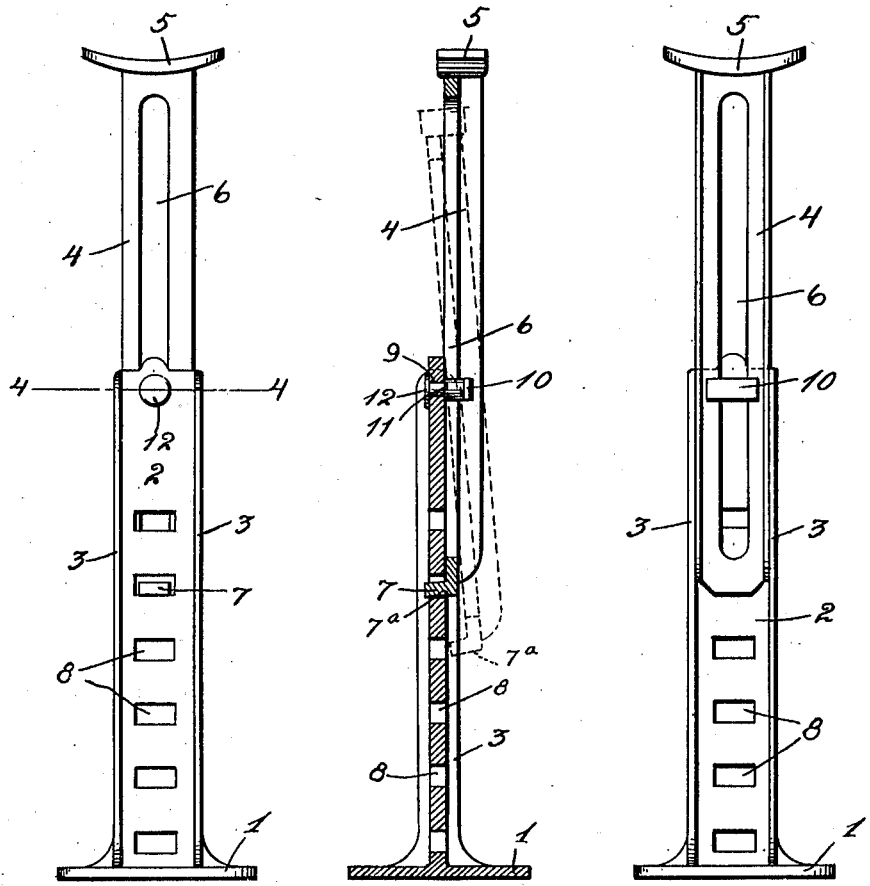
Figure 4:
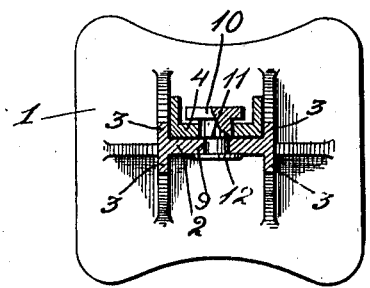

In the accompanying drawings forming a part of this specification, and in which like numerals are employed to designate like parts throughout the same. Figure 1 is a side view of the storage stand, Fig. 2 is a central vertical sectional view taken therethrough, Fig. 3 is a view similar to Fig. 1 but taken from the opposite side of the device, and Fig. 4 is a horizontal sectional view taken on line 4—4 of Fig. 1.

In the drawings wherein is illustrated a preferred embodiment of my invention, the numeral 1 designates a base, upon which is disposed a preferably vertically arranged standard 2, which may preferably be cast integral with the base 1, as is the usual custom in the manufacture of jacks. The standard 2 is provided upon each side thereof and at its longitudinal outer edges with a pair of outwardly extending flanges 3. These flanges strengthen the standard and also serve as tracks or guides for a support-bar 4, having slidable engagement with said standard 2. The support-bar 4 is disposed between the flanges 3, as clearly illustrated in Fig. 4. The support-bar 4 may preferably be substantially U-shaped in cross section, as shown. The support-bar 4 carries at its upper end a head 5 to engage the load. The support-bar 4 is further provided with a slot 6 formed therethrough and extending longitudinally thereof, said slot preferably terminating near the opposite ends of the support-bar. The support-bar 4 is provided preferably at its lower end with an inwardly extending lug 7, adapted for insertion within a selected one of a plurality of spaced superposed openings 8 formed through the standard 2, as shown. The lug 7 has its lower wall beveled, as shown at $7^a$, whereby when a load is placed upon the support-bar 4, the lug 7 cannot be withdrawn from the opening 8. This is an important feature of the invention, because when the support-bar is moved longitudinally of the standard 2, the same must be first oscillated to withdraw the lug 7 from the opening 8. It will thus be seen that means are provided to prevent the accidental withdrawal of the lug 7 when the device is supporting a load. It is to be understood that the number of openings 8 and their distance apart may be greatly varied.

The standard 2 is provided preferably adjacent its upper end with an opening 9 formed therethrough for receiving a reduced portion of a T-bolt 10. This T-bolt is preferably permanently and rigidly connected with the standard 2, its shoulder 11 engaging one side of said standard and its free end being spread or flattened, as shown at 12. The T-bolt 10, however, may have its free end screw threaded for the reception of a nut. As clearly illustrated in Fig. 4, the transverse head of the T-bolt is spaced from the support-bar 4, sufficiently to permit said support-bar to be oscillated about the upper end of the standard as an axis, so that said support-bar may assume the tilted position shown in dotted lines on Fig. 2, whereby the lug 7 may be withdrawn from the opening 8. Attention is called to the fact that the T-bolt 10 prevents the removal of the support-bar 4 from between the flanges 3, when said support-bar is moved laterally without being tilted.

In the use of the device, the load is first raised to a desired position by an ordinary jack, and my storage stand is then to be placed below the load and the support-bar 4 moved longitudinal of the standard until the lug 5 engages the load. The jack is then removed and the load is supported by the storage stand.

I wish it understood that the form of my invention herewith shown and described is to be taken as a preferred example of the same, and that certain changes in the shape, size and arrangement of parts may be resorted to without departing from the spirit of my invention or the scope of the subjoined claims.

Having described my invention, I claim:—

1. In a device of the character described, a standard provided with a plurality of spaced superposed openings formed therein, a support bar having slidable engagement therewith and adapted to be moved longitudinally of said standard to extend above the same, said support bar being provided with a longitudinal opening formed therethrough, means connected with the upper end of said standard and disposed within the longitudinal opening formed through said support bar, whereby the separation of the support bar and said standard is prevented and said support bar permitted to be oscillated in a vertical plane when the same is raised above said standard, and said support bar carrying a lug near its lower end adapted for insertion within a selected one of said openings.

2. In a device of the character described, a standard, a support bar having slidable engagement therewith, and adapted to be moved longitudinally for extending above said standard, said support bar having a longitudinal opening formed therethrough, said standard being provided with a plurality of spaced superposed openings, a bolt connected with said standard and disposed within the longitudinal opening formed through said support bar, whereby the separation of the standard and support bar is prevented and said standard permitted to be oscillated in a vertical plane upon an axis intermediate its ends when said support bar is elevated to extend above said standard, and a lug having its lower wall beveled and adapted for insertion within a selected one of the spaced superposed openings.

3. In a device of the character described, a standard provided with spaced longitudinally disposed flanges, a support bar having slidable engagement with said standard and disposed between said flanges whereby said support bar is prevented from turning in a horizontal plane with relation to said standard, a T-bolt connected with the upper end of said standard, said support bar being provided with a longitudinal slot formed therethrough for receiving said T-bolt, whereby the separation of said standard and support bar is prevented and said support bar permitted to be oscillated in a vertical plane when the same is moved above said standard, and a lug connected with the lower end of said standard, said lug having its lower wall beveled and being adapted for insertion within a selected one of said spaced superposed openings.

In testimony whereof I affix my signature in presence of two witnesses.

LE ROY WILLOUR.

Witnesses:
J. A. SHEARER,
J. B. DAUCER.

---

Copies of this patent may be obtained for five cents each, by addressing the "Commissioner of Patents, Washington, D. C."